United States Patent [19]

Raz

[11] 4,346,735
[45] Aug. 31, 1982

[54] WATER FAUCET AND ATTACHMENT THEREFOR

[75] Inventor: Zeev Raz, Beersheva, Israel

[73] Assignee: Ben-Gurion University of the Negev, Israel; a part interest

[21] Appl. No.: 88,509

[22] Filed: Oct. 26, 1979

[30] Foreign Application Priority Data

Nov. 6, 1978 [IL] Israel ...................................... 55884

[51] Int. Cl.³ ............................................. F16K 19/00
[52] U.S. Cl. .................................. 137/606; 137/616.7; 137/801; 251/352
[58] Field of Search ............ 137/603, 606, 607, 616.7, 137/801, 616, 616.3, 616.5; 251/352, 349, 351, 354

[56] References Cited

U.S. PATENT DOCUMENTS

| 656,759 | 8/1900 | Wirt | 137/616.5 |
| 749,285 | 1/1904 | Gardenier | 137/616.5 X |
| 1,854,796 | 4/1932 | Kersten | 137/801 |
| 2,790,632 | 4/1957 | Mellette | 137/616.7 X |
| 3,322,152 | 5/1967 | Aechter | 251/352 X |
| 3,593,961 | 7/1971 | Stewart | 251/349 |
| 3,610,280 | 10/1971 | Kitamura | 137/616.5 |
| 3,726,318 | 4/1973 | Hyde | 137/616.7 X |
| 4,083,383 | 4/1978 | Antoniello | 137/616.7 |
| 4,200,123 | 4/1980 | Brandelli | 137/616 X |

FOREIGN PATENT DOCUMENTS

| 701851 | 3/1931 | France | 137/616.7 |
| 327547 | 8/1935 | Italy | 251/352 |
| 433713 | 8/1935 | United Kingdom | 251/352 |

Primary Examiner—Robert G. Nilson
Attorney, Agent, or Firm—Steele, Gould & Fried

[57] ABSTRACT

A water-saving faucet, particularly for kitchen sinks and bathroom basins, is provided. The faucet comprises at least one water valve, a sink-sweeping movable spout and a spout valve means coupled to the spout. The open and closed states of the faucet are controllable by the movable spout and the open state of the faucet is substantially unaffected by the sweep of the movable spout across the effective area of the sink or basin. An attachment for converting a standard mixing faucet having a movable spout into a water-saving mixing faucet is also provided.

8 Claims, 10 Drawing Figures

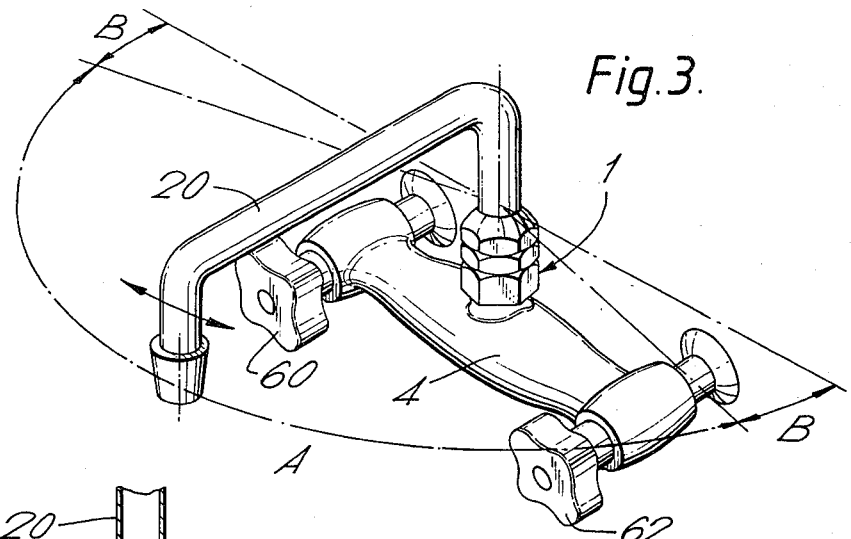
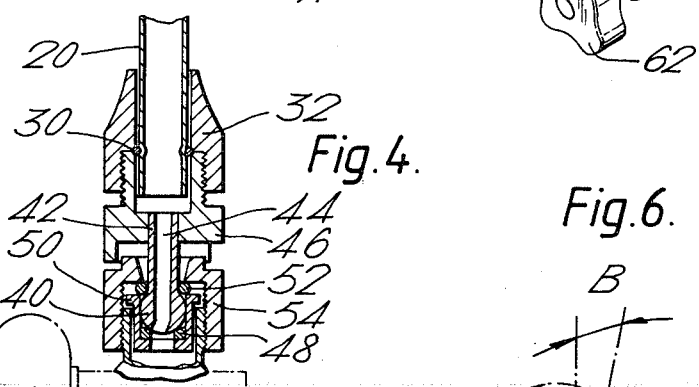
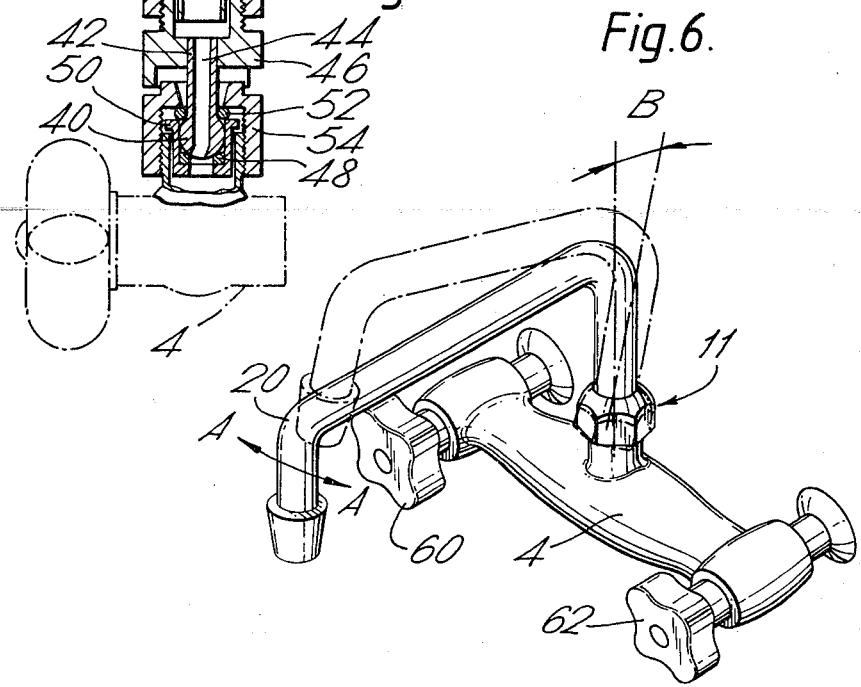

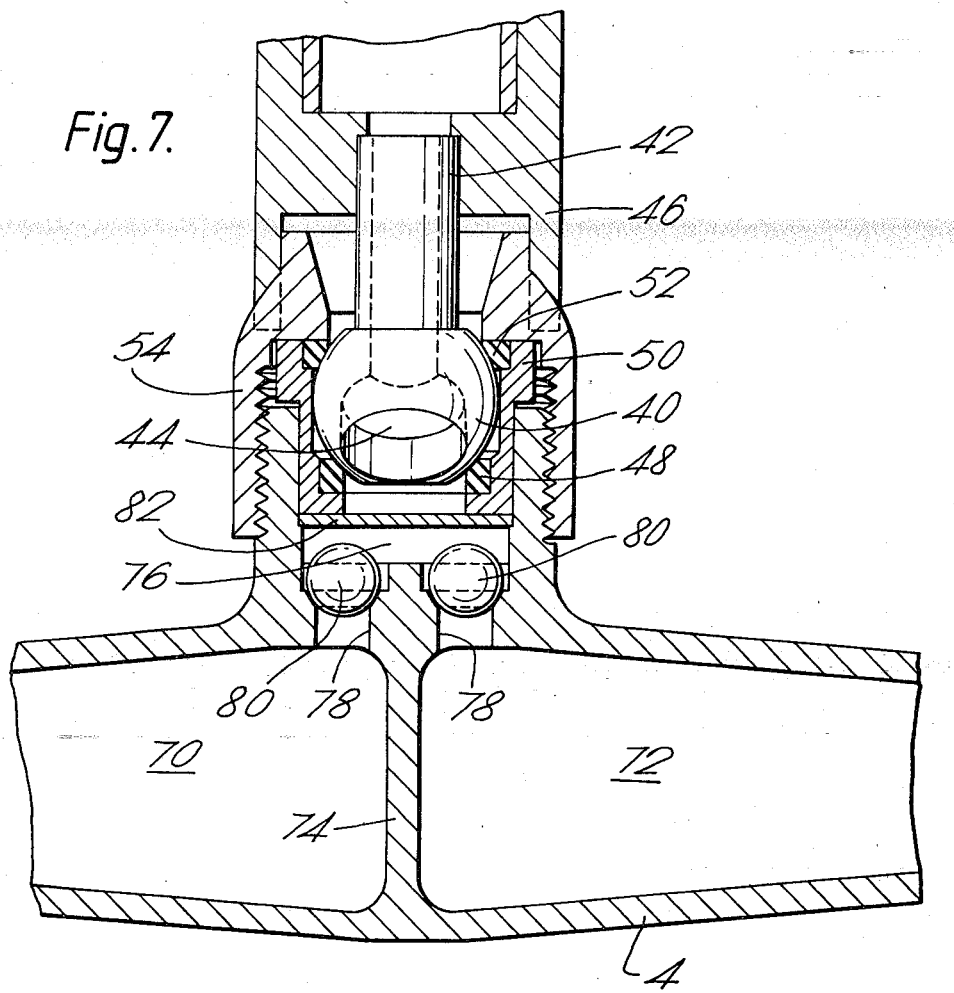

WATER FAUCET AND ATTACHMENT THEREFOR

BACKGROUND OF THE INVENTION

1. Field of the Invention

The present invention relates in general to a water-saving single temperature or mixing faucet, especially for kitchen sinks and bathroom basins, comprising a movable spout controlling the "open" and "closed" states of the faucet and also to an attachment for converting standard mixing faucets into such water-saving mixing faucets.

2. Prior Art

Mixing faucets are an essential component of modern kitchens and bathrooms, and much thought and ingenuity has been invested in attempts to improve their design and make them more convenient to use. An important part of the convenience, in particular, of a kitchen sink, is a movable spout which can be brought over a particular section of the sink, or can be swung out of the way, so as not to interfere, if not needed. The main object of the above-mentioned efforts at improvement have been directed towards improving such a spout, with two major lines of approach and development: (1) To control, by swiveling of the spout, the flow rate in a continuous range from zero to maximum flow, but not the water temperature (e.g., U.S. Pat. No. 1,790,625); and (2) to control, by swiveling of the spout, both the flow rate and the water temperature (e.g., U.S. Pat. Nos. 2,181,630 and 2,504,610). All these known solutions suffer from two main drawbacks: they are complicated, requiring closely fitting pistons, cams, rollers, multiple-start threads and similar components which are both relatively expensive and failure-prone, especially when used with mineral-rich water. Most important, said solutions forego the great convenience of directing a certain, preset flow at a certain, preset temperature across the entire area of the sink, as any change in the angular portion of the spout will also change either the flow rate or both the flow rate and the temperature, which means that very hot water is obtainably only, say, on the right side of the sink, cold water only on the left, and medium temperatures only in the middle. Flow control, too, is, of course, a function of spout position in said prior art embodiments. Another disadvantage of the known mixing faucets is the fact that the active components of these faucets cannot be fitted to existing mixing faucets of the conventional type.

SUMMARY OF THE INVENTION

It is the object of the present invention, to overcome these drawbacks and to provide a single temperature faucet or a mixing faucet of a simple and reliable design, the movable spout of which can deliver water at a preset flow rate and temperature over the entire effective area of a sink. As will be described hereinafter, with the novel faucet of the present invention tilting the spout in the vertical direction or pushing the spout in either direction close to, or beyond, the edge of the effective sink area, will simply shut off the flow, a great inducement to saving water, as there is no need to turn valves and, incidentally, change the flow-rate and temperature setting.

The present invention achieves these results by providing a water saving faucet particularly for kitchen sinks and bathrooms basins, having at least one water valve, comprising a sink-sweeping movable spout coupled to a spout valve, said spout valve comprising means for blocking the water flow-path between at least one water inlet of said faucet and said spout, wherein movement imparted to said spout is also transmitted to said means of said spout valve and wherein over a first continuous range of selected positions of said movable spout said means are moved to allow the establishment of said flow-path, while in at least one other range of selectable positions of said spout, said means are moved to block said flow-path, whereby the open state of said faucet is substantially unaffected by the sweep of said movable spout across said entire first range of selected positions and the closed state of said faucet is controllable by the movement of said spout within said other range of positions to effect the stop of flow of water through said spout.

The invention further provides an attachment for converting a standard mixing faucet, having a movable spout and hot-water and cold-water valves, into a water-saving mixing faucet, comprising a spout valve inter-connectable between said spout and said faucet body, said spout valve having at least one substantially axial passage leading at one end into the interior of said movable spout, which spout valve is controlled by the movement of said spout so as to selectively establish, over a first continuous range of selected positions, a communication path between a mixing chamber of said faucet and the interior of said spout, to produce a flow of water of preset temperature and flow rate and, in at least one other range of selectable positions, to substantially cut off said communication path and stop said flow, whereby the open state of said faucet is substantially unaffected by the sweep of said movable spout across said entire first range of selected positions and the closed state of said faucet is controllable by the movement of said spout within said other range of positions to effect the stop of flow of water through said spout.

BRIEF DESCRIPTION OF THE DRAWINGS

While the invention will now be described in connection with certain preferred embodiments, it will be understood that it is not intended to limit the invention to these particular embodiments. On the contrary, it is intended to cover all alternatives, modifications and equivalent arrangements as may be included within the scope of the invention as defined by the appended claims. Nevertheless, it is believed that embodiments of the invention will be more fully understood from a consideration of the following illustrative description read in conjunction with the accompanying drawings, in which:

FIG. 3 is a perspective view of an embodiment of the mixing faucet according to the invention having a sweeping spout;

FIG. 4 is a cross-sectional view of another embodiment of the attachment according to the invention;

FIG. 6 is a perspective drawing of the embodiment of the mixing faucet according to FIG. 5 having a tilting spout;

FIG. 7 is a cross-sectional view of part of the mixing faucet shown in FIG. 4, including a partition and check means;

DETAILED DESCRIPTION OF THE PREFERRED EMBODIMENTS

Figure 1:
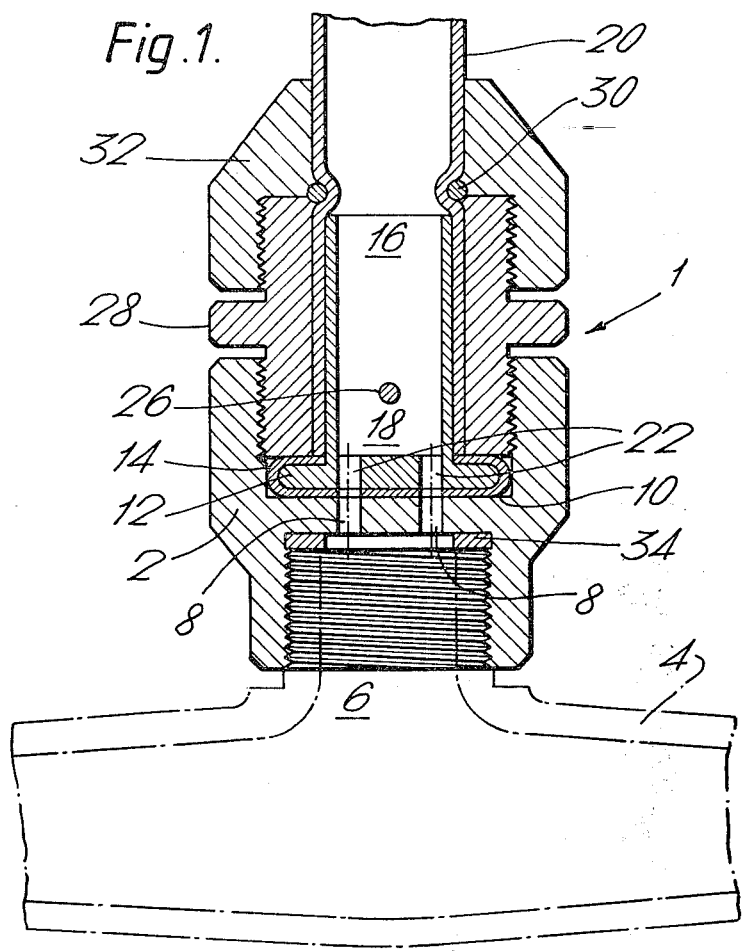
FIG. 1 is a cross-sectional view of an embodiment of the attachment according to the invention for converting a standard mixing faucet into a water-saving mixing faucet.
Figure 2:
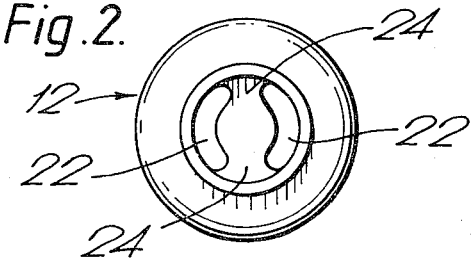
FIG. 2 is a plane view of the spout valve of the embodiment shown in FIG. 1.

There is shown in FIG. 1 an attachment 1 according to the invention, by means of which a standard mixing faucet can be converted into a water-saving mixing faucet. An adaptor 2 in the form of a threaded, flat-bottomed double socket takes the place of the usual union nut which connects the movable spout to the faucet body 4 (indicated by the broken line). This adaptor 2 closes the outlet aperture 6 of the faucet body 4, except for two circular holes 8. The upper half of the adaptor 2, into the smooth bottom of which open the holes 8, constitutes the counterface 10 of the spout valve 12, to the sealing surfaces of which there is attached a sealing layer 14 consisting of a tough, low-friction plastic such as CAPRON or the like. The spout valve 12 is of a generally hollow cylindrical shape, of which the downstream end portion 16 is open towards the spout 20 and the upstream bottom end portion 18 is partly closed. Said spout valve 12 is provided with two oppositely located, substantially circular, slot-like openings 22 of an angular extent of less than 180°, seen to better advantage in FIG. 2. Between the respective ends of these slot-like openings 22 there are left solid bottom sections 24, which, at their narrowest point are at least as wide as the width of the circular slot-like openings 22, which width, in turn, is substantially equal to the diameter of the holes 8 in the counterface 10. The holes 8 and the slot-like openings 22 are located on the same pitch circle, as is shown in FIG. 1. The hollow, cylindrical shank of the spout valve 12 fits into the spout 20, to which it is rigidly connected by means of at least one pin 26, so that every swivel movement imparted to the spout 20 is also transmitted to the spout valve 12. The spout 20, being mostly of a standard size, could conceivably be the original spout of the mixing faucet to be converted, in which case the user would have to drill a hole through the spout end and through the inserted shank of the spout valve 12, to accommodate the pin 26. However, for convenience, the spout 20 is preferably delivered in the assembled state, as part of the attachment according to the invention.

The spout valve 12 is held down with minimum clearance by a nipple 28 which screws into the adaptor 2 and has a cylindrical bore providing an easy fit for the spout 20 which passes through it. The spout 20 is sealed off as in standard faucets by an O-ring 30 held down by a retaining nut 32. A gasket 34 ensures a tight fit between the adaptor 2 and the outlet nipple of the faucet body 4.

With reference now also to FIG. 3 the spout valve 12 functions as follows: As long as the circular holes 8 in the counterface 10 are within the angular range of, and register with, the slot-like openings 22, the spout 20 is in the "open" position. This angular range would correspond to the range A (FIG. 3) along any point of which the spout 20 will deliver a flow of water at a temperature and rate preset with the aid of the hot- and cold-water valves 60 and 62. It is a characteristic feature of the attachment according to the invention that as long as the spout 20 remains in its sweep across the sink within this range A, the open state of the faucet, as preset, remains substantially unaffected by the actual position of the spout. When the spout 20 is moved beyond this range A and into either of the ranges B, the spout valve 12, moving together with the spout 20, causes the circular holes 8 to increasingly come within the angular range of, and become covered by, the solid bottom portions or sections 24 (FIG. 2) of the spout valve 12, thereby cutting off the flow from the spout 20, even though the hot- and cold-water valves are still in their preset state of openness. Returning the spout 20 to any point within the range A will immediately restore delivery at the preset temperature and flow rate. Advantageously, the shut-off range B has an angular extent of about 20° to 35° and preferably about 30°, which is the angular extent through which the spout needs be moved to change the flow rate from its preset maximum to complete cut-off.

Figure 5:
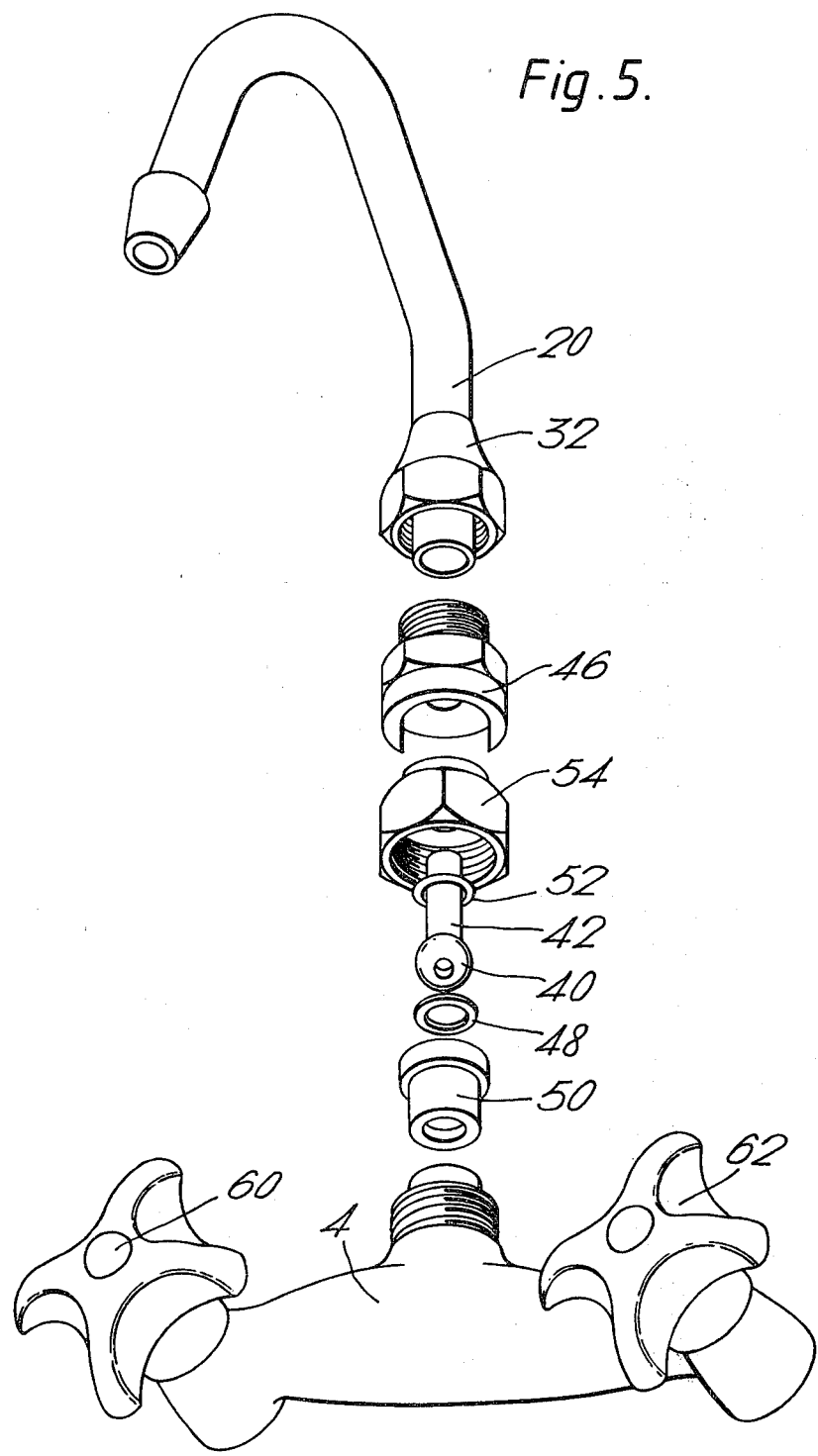
FIG. 5 is an exploded view of the embodiment shown in FIG. 4.

Another attachment or arrangement according to the invention is shown in cross section in FIGS. 4 and 5 with reference also to FIG. 6. The spout valve in this embodiment has the form of a "ball-and-socket" joint, comprising a spherical valve head 40 at the end of a substantially cylindrical shank 42. A bore 44 passes through the spout valve in a substantially axial direction. The shank 42 is fixedly mounted in an intermediate piece 46, the downstream end of which has the form of a threaded nipple with a central bore large enough to accommodate the upstream end of the spout 20 held in position, but still rotatable, by the commonly used device of a rolled-in groove in the spout, a sealing ring 30 and a retaining nut 32. Due to the intermediate piece 46, the valve shank 42 and, thus the entire valve body, is held in rigid axial alignment with the spout 20, i.e., any tilting movement imparted to the spout 20 is also transmitted to the valve body. The "socket" of this "ball-and-socket" arrangement is formed by an annular valve seat 48 made of a suitable material such as TEFLON or the like and housed in a valve-seat support 50 tightly inserted into the outlet socket of the faucet 4 to be converted. The spout valve is maintained within the valve-seat support 50 and pressed against the valve seat 48 by a sealing ring 52 held down by an adaptor 54 screwed onto the threaded outlet socket of the faucet 4 to be converted or fitted therewith.

The spout valve according to this embodiment works as follows: in a non-tilted first position of the spout 20 (solid lines in FIG. 6) the ball-side end of the bore 44 is located within the central opening of the valve seat 48, as clearly seen in FIG. 4, allowing the water to pass from the faucet 4 via the valve bore 44 into the interior of the spout 20. However, in a tilted position of the spout 20 (broken lines in FIG. 6), the ball-side end of the bore 44 moves beyond the central opening of the annular valve seat 48, preventing passage of water therethrough.

While the valve bore 44 could conceivably be straight over its entire length, the angular extent (designated B in FIG. 6) of the tilt required to shut off the flow of water can be substantially reduced if, as is shown in FIG. 4, a length of the ball-side end of the bore 44 is slanted with respect to the axis of the valve body. In this embodiment, too, the flow-stopping spout movement (in this case, a tilt) extends advantageously over an angular range of about 20° to 35° only, and preferably about 25°.

The operational difference between the embodiments shown in FIG. 1 and FIG. 4 is that in the embodiment of FIG. 1, the sink-sweeping spout movement and the flow-stopping spout movement are co-planar swiveling movements about the same, substantially vertical axis, while in the embodiment of FIG. 4, the sink-sweeping spout movement and the flow-stopping spout movement are, respectively, a swiveling and a tilting movement about two different, intersecting axes.

FIG. 7 shows an arrangement, part of a faucet according to FIG. 4 of the invention and advantageously provided in the first embodiment also, which prevents the infiltration of hot water into the cold-water mains, and of cold water into the hot-water mains. Such an infiltration may happen when pressures in the hot- and cold-water mains are unequal and the flow of water is shut off only by means of the spout, while the hot- and cold-water valves are still fully or partly open. To prevent this situation the tubular yoke or faucet body 4 of the faucet, which connects the outlet chambers of the hot- and cold-water valves, is divided into a hot-water chamber 70 and a cold-water chamber 72 by a water-tight partition 74, each of these two chambers being connected to a common mixing chamber 76 by a separate passage 78, which passages are provided with check means in the form, e.g., of ball valves 80 opening only when pressure is applied from below. This arrangement permits flow from the hot- and cold-water chambers 70 and 72 into the mixing chamber 76, but prevents flow from the mixing chamber 76 into the hot- and cold-water chambers 70 and 72. A grid 82 lets the water pass, but prevents the check balls 80 from leaving their seats more than required for their proper functioning.

If the attachments shown in FIGS. 1 or 4 are to be used on one temperature faucets or mixing faucets not provided with these or other anti-infiltration means, (check valves in the hot- and/or cold-water mains), the infiltration problem can be solved to some degree by adjusting whatever spout valves are used, in such a way that water flow cannot be completely cut off by means of the spout which, even in its extreme swiveling or tilting position, will have a small trickle. This insubstantial trickle will serve as a reminder to the user, that the hot- and cold-water valves must still be turned off.

Heretofore have been described having faucets comprising a hot-water valve 60 and a cold-water valve 62, wherein the flow rate and the temperature are exclusively controlled by the movable spout and the "open" state of the faucet is substantially unaffected by the sweep A of the movable spout 20 across the effective area of the sink.

Figure 8:
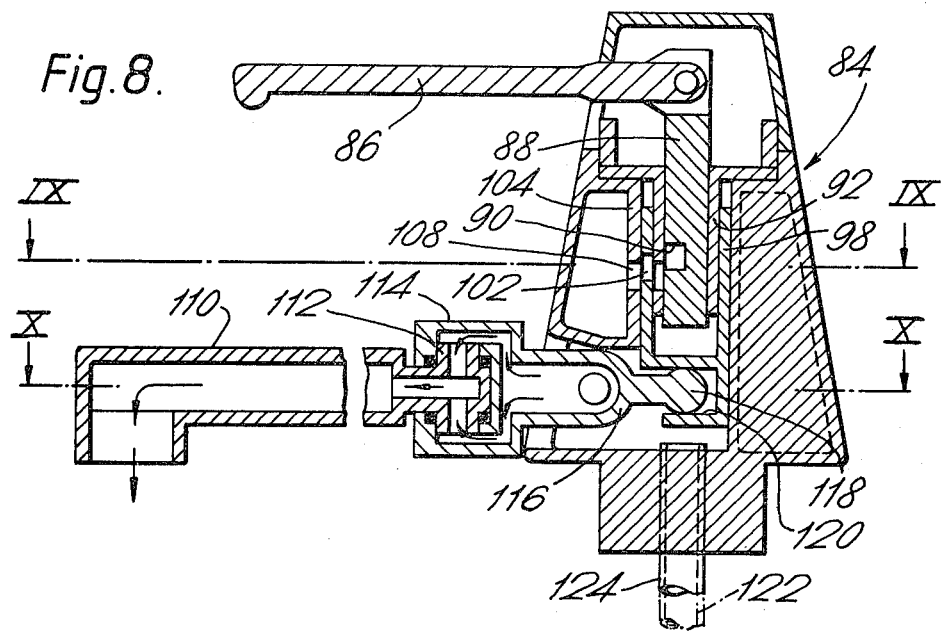
FIG. 8 is a cross-sectional view of a single handle mixing faucet.

In FIG. 8 there is illustrated a single handle mixing faucet 84 according to the invention which permits control of faucet output temperature and rate by moving a single handle only. The embodiment shown includes the features of a single control handle and a sweeping spout wherein after the initial adjustment of the desired water temperature and flow rate, the sweeping spout may be tilted in a vertical plan to open or close the output flow.

As seen in the figures, the handle 86 is pivotally attached to a central stem 88 having a cut-out section 90. The stem is disposed within a tubular housing portion 92 having two diametrically opposite inlet apertures 94 and a further outlet aperture 96. A closed bottom tubular sleeve 98 having inlet apertures 100 and an outlet aperture 102 corresponding to apertures 94 and 96, is slidingly disposed between housing portions 92 and 104. Housing portion 104 is also provided with apertures 106 and 108 in alignment with apertures 94 and 96. A spout 110 is hingedly coupled at 112 to a fitting 114 for movement in a horizontal plane while said fitting is hingedly affixed to the interior of the faucet for movement in a vertical plane. For achieving the latter movements, the base 116 of the fitting is provided with a cylindrical joint 118 which is held inside a seat 120 being a portion of the sleeve 98. Conduits 122 and 124 supply the hot and cold water to the interior of the faucet.

Figure 9:
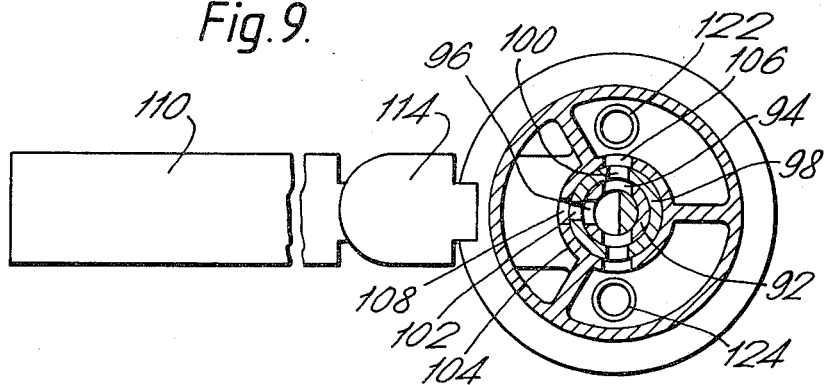
FIG. 9 is a cross-sectional view across the line IX—IX of FIG. 8.
Figure 10:
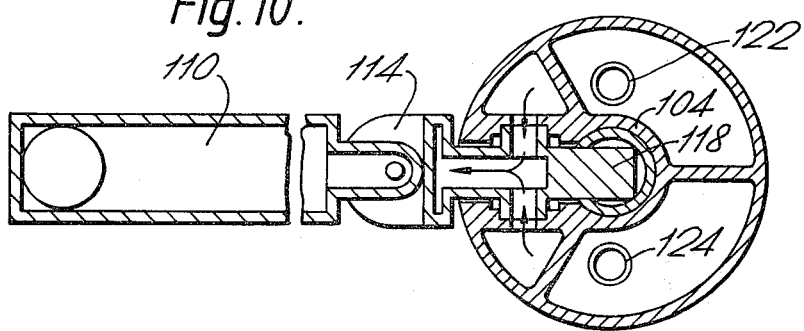
FIG. 10 is a cross-sectional view across the line X—X of FIG. 8.

The hot and cold water entering the faucet through the conduits 112 and 124 pass through the apertures 106, 100 and 94, are mixed and flow out the apertures 96, 102 and 108 when all apertures are suitably aligned. As can be seen to better advantage in FIG. 9, the rotation of the handle 86 will govern the opening size of the apertures leading, respectively, to the hot and cold conduits while when the handle 86 is raised or lowered, the outlet aperture 96 will be partly or entirely blocked by the stem, depending on the position of the cutout 90 relative the aperture 96.

After the setting of the handle to a desired position for supplying water at the selected rate of flow and desired temperature, when the spout 110 is tilted upwardly, the sleeve 98 will slide downwardly and block the inlet as well as outlet apertures to cut-off the water flow. The mere lowering of the spout 110 will again allow the water to flow at the preselected temperature and flow rate.

It should be realized that the known thermostatically controlled faucets having a single flow-rate control valve could also be fitted with a sweeping and/or tilting spout according to the present invention. Moreover, while the present invention is particularly applicable for mixing faucets, it could obviously be applied in the same manner for single water temperature faucets.

Furthermore, although in the embodiment shown, the spout is coupled to, and controls the movement of a spout valve having at least one opening establishing a flow-path between the water inlet or inlets and the spout, it should be appreciated that instead of this spout valve, the spout may be coupled to a simple valve, comprising merely a movable plate member which is adapted to be displaced by the movement of the spout across the water inlet(s) to establish a flow-path or to block the same as selected by the movement of the spout.

Also, it should be added that for convenience and safety of the user, the spout is advantageously provided with, or covered by, thermally insulating means.

Finally, it will be evident to those skilled in the art that the invention is not limited to the details of the foregoing illustrative embodiments and that the present invention may be embodied in other specific forms without departing from the essential attributes thereof, and it is, therefore, desired that the present embodiments be considered in all respects as illustrative and not restrictive, reference being made to the appended claims, rather than to the foregoing description in which it is intended to claim all modifications coming within the scope of the invention.

What is claimed is:

1. A water saving faucet particularly for kitchen sinks and bathroom basins, having at least one water valve, comprising:

a single-conduit spout having an inlet end and mounted for substantially unlimited sink-sweeping movement about a sweep axis as well as for tilting movement about a tilt axis, the axes being different but intersecting;

a mechanically operated spout valve located adjacent to the inlet end of said spout, having means for blocking and opening a waterflow path between the at least one water valve and said spout; and means mechanically linking said blocking means to said spout, tilting movements of said spout positively moving said blocking means into and out of said waterflow path, providing a first range of selectable tilt positions which provide a continuous range of selectable waterflow rates through the spout from shut-off to maximum at any preadjusted temperature, and providing at least one other continuous range of selectable spout positions in which said blocking means are moved to block said waterflow path, control of the waterflow rate in both the first and the at least one other continuous ranges of selectable tilt positions, due to tilting movements about the tilt axis, being completely independent of said sink-sweeping movements about the sweep axis, whereby waterflow rates, including shutoff, and water temperature remain unchanged during sink-sweeping movement.

2. The faucet according to claim 1, wherein said blocking means comprises at least one opening in said spout valve for establishing the waterflow path between at least one water inlet of said faucet and said spout, and wherein over the first continuous range of selectable positions of tilt of said tiltable spout the opening in said spout valve is brought into alignment to establish a flow-path between said water inlet and said spout, while in the at least one other range of selectable positions of said spout said opening is is brought out of alignment to allow a body portion of said spout valve to block said flow-path.

3. The faucet according to claim 1, wherein said faucet is a mixing faucet having at least one hot-water valve, at least one cold-water valve and a mixing chamber connected thereto.

4. The faucet according to claim 1, further comprising a mixing chamber connected to said spout by said spout valve, said mixing chamber producing a flow of water of a preset temperature and flow rate, over said first continuous range of selectable positions of tilt, and said valve being adapted to stop said flow in at least one continuous range of selectable positions of said spout beyond said flow-producing range.

5. The faucet according to claim 1 or 4, wherein said spout valve has the form of a ball-and-socket joint, comprising a valve body having a spherical valve head at the end of a substantially cylindrical shank rigidly aligned with said tiltable spout, and further comprising an annular valve seat, said valve body being provided with a bore passing through it in a substantially axial direction, the arrangement being such that, within said first range of positions of said spout, the ball-side end of said bore comes to be located within the central opening of said valve seat, allowing the water to pass, while in said other range of positions of said spout, the ball-side end of said bore proceeds to move beyond said central opening of said annular valve seat, preventing passage of water therethrough.

6. The faucet according to claim 5, wherein a length of the ball-side end of said bore in said valve body is slanted with respect to the axis of said valve body.

7. An attachment for converting a standard mixing faucet, having a body with a mixing chamber and a sink-sweeping spout with an inlet end, into a water saving mixing faucet, having a tiltable as well as sink-sweeping spout, comprising:

means for mounting the spout for tilting movement about a tilt axis as well as the sink-sweeping movement about a sweep axis, the axes being different but intsecting;

a mechanically operated spout valve interconnectable between said spout and said faucet body, said spout valve having means for blocking and opening a water flow-path between said mixing chamber and the inlet and of spout; and, means mechanically linking said blocking means to said spout, tilting movements of said spout positively moving said blocking means into and out of said waterflow path, providing a first range of selectable tilt positions which provide a continuous range of selectable waterflow rates through the spout from shut-off to maximum at any preadjusted temperature, and providing at least one other continuous range of selectable spout positions in which said blocking means are moved to block said waterflow path, control of the waterflow rate in both the first and the at least one other continuous ranges of selectable tilt positions, due to tilting movements about the tilt axis, being completely independent of said sink-sweeping movements about the sweep axis, whereby waterflow rates, including shut-off, and water temperature remain unchanged during sink-sweeping movement.

8. The attachment according to claim 7, wherein said blocking means of said spout valve comprises at least one substantially axial passage in said spout valve.

* * * * *